United States Patent [19]

Cocco

[11] 4,401,381
[45] Aug. 30, 1983

[54] PROCESSING APPARATUS FOR SELF-PROCESSING FILM UNIT WITH A FOLDED APPLICATOR

[75] Inventor: Vincent L. Cocco, Wakefield, Mass.

[73] Assignee: Polaroid Corporation, Cambridge, Mass.

[21] Appl. No.: 436,078

[22] Filed: Oct. 22, 1982

[51] Int. Cl.³ .................. G03B 17/52; G03D 9/00
[52] U.S. Cl. .................. 354/303; 354/86; 354/88
[58] Field of Search .............. 354/83, 84, 85, 86, 354/87, 88, 301, 303, 304, 305, 318

[56] References Cited

U.S. PATENT DOCUMENTS 2,477,304  7/1949  Land ............................ 354/86
2,477,324  7/1949  Wolff ........................... 354/86
3,763,753  10/1973  Harvey ......................... 354/86

Primary Examiner—Alan Mathews
Attorney, Agent, or Firm—John S. Vale

[57] ABSTRACT

A processing apparatus is provided for use with a self-processing film unit of the type including a photosensitive sheet-like film component and a folded and releasably sealed processing liquid applicator secured thereto. The apparatus includes a support for the film unit and an applicator manipulating mechanism that is operable to unseal the applicator and move it to an extended position overlying the film component to bring a substantially uniformly distributed supply of processing liquid carried on an interior surface of the applicator into contact with an outer surface of the film component to initiate processing of the film component.

13 Claims, 16 Drawing Figures

PROCESSING APPARATUS FOR SELF-PROCESSING FILM UNIT WITH A FOLDED APPLICATOR

BACKGROUND OF THE INVENTION

The present invention relates to the field of photography and, more specifically, to processing appartus for manipulating a self-processing film unit to effect wetting of a given surface area thereof with a low-viscosity processing liquid.

Commonly assigned co-pending application U.S. Ser. No. 436,189, filed on even date herewith, discloses and claims a self-processing film unit comprising a sheet-like photosensitive film component and a liquid applicator secured to one end portion thereof.

The film component includes one or more photosensitive layers and has an outer surface with a given area thereof that is configured to be wetted with a low-viscosity processing liquid, following exposure, to initiate processing of the one or more photosensitive layers.

The liquid applicator is secured to the film component outside of the given area and includes a liquid and air impervious sheet dimensioned for extension over the outer surface in covering relation to the given area. The applicator also includes means on one surface of the impervious sheet yieldably holding a substantially uniformly distributed supply of a low-viscosity processing liquid sufficient to wet the given area. The liquid holding means may include, for example, an absorbent pad soaked with processing liquid. The applicator is initially provided on the film component in a folded over and releasably sealed configuration wherein the impervious sheet forms a liquid and air impervious enclosure about the liquid holding means. Following exposure of the film component, the applicator is moved to an unsealed extended configuration overlying the outer surface with the liquid holding means in liquid yielding contact with the given area to effect wetting thereof.

The applicator is formed during manufacture by folding the impervious sheet, having the liquid holding pad on its interior surface, over on itself to define opposed wall sections of the enclosure and releasably sealing the three free facing edges or margins of the sheet to hermetically seal the pad therein. By securing the folded applicator to the end of the film component during manufacture, the enclosed pad is preregistered and aligned with respect to the given area.

To effectively use this type of film unit, there is a need for a processing apparatus which, following exposure of the film component, is operative to manipulate the applicator in a manner that unseals the marginal seals of the enclosure then moves the impervious sheet to its extended position to bring the liquid holding pad into liquid yielding contact with the given area of the film component outer surface.

Commonly assigned U.S. Pat. No. 2,477,324 discloses a self-developing camera having a film processing apparatus therein for pivoting an image receiving sheet away from its initial superposed position, over a photosensitive sheet, to an upright position to allow exposure of the photosensitive sheet and, thereafter, pivoting the image receiving sheet back to its initial superposed position in preparation for advancing the two film elements between a pair of pressure applying rollers for processing. However, there is no teaching or even suggestion therein of providing a processing apparatus that provides the necessary functions to manipulate the folded applicator described above.

Therefore, it is an object of the present invention to provide a processing apparatus for use with a self-processing film unit of the type including a sheet-like film component and a liquid applicator that is movable from an initial folded position to an extended position.

It is another object to provide such an apparatus which is operable to unseal the folded applicator and move it to an extended position to locate liquid holding means on the applicator into liquid yielding contact with a given surface area of the film component.

It is yet another object of the invention to provide such an apparatus which is operative to initially move the folded applicator from an initial position overlying a portion of the film component's exposure surface to a sufficiently upright position with respect to the film component so as not to block the exposure path thereto.

Other objects of the invention will, in part, be obvious and will, in part, appear hereinafter.

SUMMARY OF THE INVENTION

The present invention provides a processing apparatus for use with a self-processing film unit of the type including a sheet-like film component, including one or more photosensitive layers and having an outer surface with a given area thereof that is configured to be wetted with a low-viscosity processing liquid to initiate processing of the one or more layers, and a liquid applicator. The applicator is secured to one end of the film component and includes an impervious sheet carrying on an inner surface thereof means yieldably holding a substantially uniformly distributed supply of the low-viscosity processing liquid. The applicator is initially provided in a folded and releasably sealed configuration forming an impervious enclosure about the liquid holding means and it is configured for movement to an unsealed extended configuration overlying the outer surface of the film component with the liquid holding means in liquid yielding contact with the given area to effect wetting thereof.

The processing apparatus comprises: means for supporting such a film unit; and means, engageable with the folded applicator, for unsealing the impervious sheet and means for moving the unsealed applicator to its extended configuration to locate the liquid holding means in liquid yielding contact with the given area to effect wetting thereof.

In the illustrated embodiment, the apparatus includes a movable pick mechanism for engaging the folded applicator and urging opposed wall sections thereof apart to break marginal seals about the periphery of the applicator. The pick also moves the unsealed applicator rearwardly to a partially deployed position over the sheet-like film component. The pick then urges the film unit into the bite of a pair of pressure applying rollers which serve to urge the liquid holding means into good contact with the given area of the outer surface of the film componet.

In one embodiment of the film unit, the folded applicator is initially located in substantially overlying relation to a portion of the outer surface of the film component and the processing apparatus further includes means for pivoting the applicator to a position that is sufficiently upright with respect to the outer surface before comencement of unsealing operations. When the outer surface of the film unit is the exposure surface, such movement of the applicator to the sufficiently upright position serves to move it out of an optical path along which image forming light is transmitted to expose the photosensitive film component.

BRIEF DESCRIPTION OF THE DRAWINGS

For a fuller understanding of the nature and object of the invention, reference should be made to the following detailed description with accompanying drawings wherein.

DESCRIPTION OF THE PREFERRED EMBODIMENT

Figure 1:
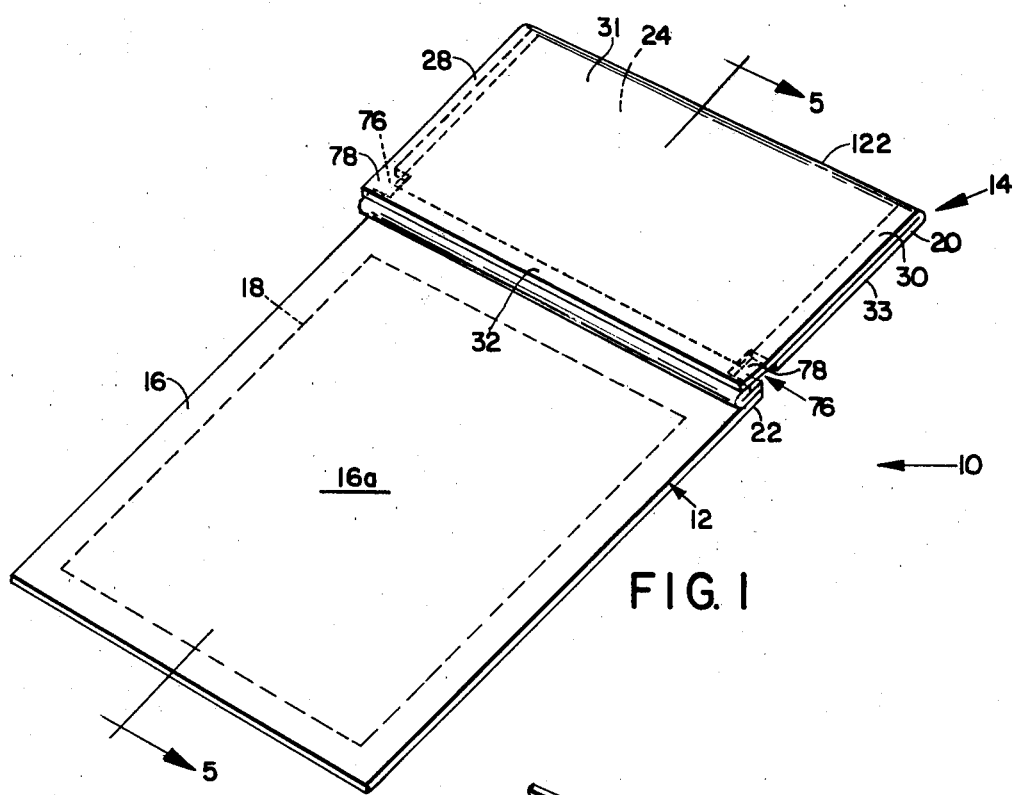
FIG. 1 is a perspective view of a self-processing film unit, adapted for use with a processing apparatus embodying the present invention, showing a liquid holding applicator in its initial folded and sealed position secured to one end of a sheet-like film component.

The present invention provides a processing apparatus 90 for use with a low-cost, self-developing film unit 10, shown in FIGS. 1, 2, 3 and 4, comprising a sheet-like photosensitive film component 12 and processing liquid applicator 14 secured to one end position of component 12 and holding therein a supply of low viscosity liquid processing composition.

Broadly speaking, the film component 12 includes a base or support sheet having one or more layers coated thereon including one or more photosensitive layers that are adapted to be exposed to actinic radiation to form a latent image therein. Following exposure, the liquid processing composition in applicator 14 is brought into contact with a designed outer surface of film component 12, such as the top surface 16 shown in FIG. 1, to wet a predetermined given area thereof, such as the rectangular area 16a bounded by dotted lines 18, that generally coincide with a delineated image forming area to initiate processing of film component 12 which may include the step of developing the latent image in the exposed photosensitive layer or layers.

In the illustrated embodiment, applicator 14 includes a liquid and air-impervious sheet 20 (see FIG. 5) secured to a leading end portion of film component 12 outside of the bounds of the given area 16a. Sheet 20 is dimensioned for extension over the outer film component surface 16 in, at least, covering relation to area 16a. The applicator 14 also includes, on one surface of sheet 20, means for yieldably holding a substantially uniformly distributed supply of a low viscosity processing liquid sufficient to wet the given area 16a, for example, a rectangular or square absorbent or porous pad 24, or the like, soaked with a processing liquid 26 and disposed on a central area of an interior surface 27 of sheet 20.

Figure 5:
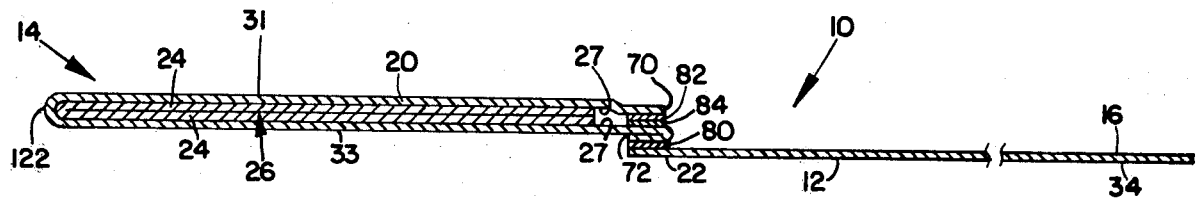
FIG. 5 is a longitudinal cross-sectional view of the film unit of FIG. 1 taken along 5—5.

The applicator 14 is initially provided on component 12, during manufacture, in the folded substantially flat configuration shown in FIGS. 1 and 5 wherein sheet 20 is folded back over on itself and is releasably sealed along two longitudinally extending marginal portions 28 and 30 and a transverse and laterally extending marginal portion 32 to form a liquid and air-impervious enclosure about the liquid holding means or pad 24 which also assumes a folded configuration on the interior surface 27 of sheet 20. When so folded, sheet 20 defines opposed enclosure wall sections 31 and 33.

Figure 2:
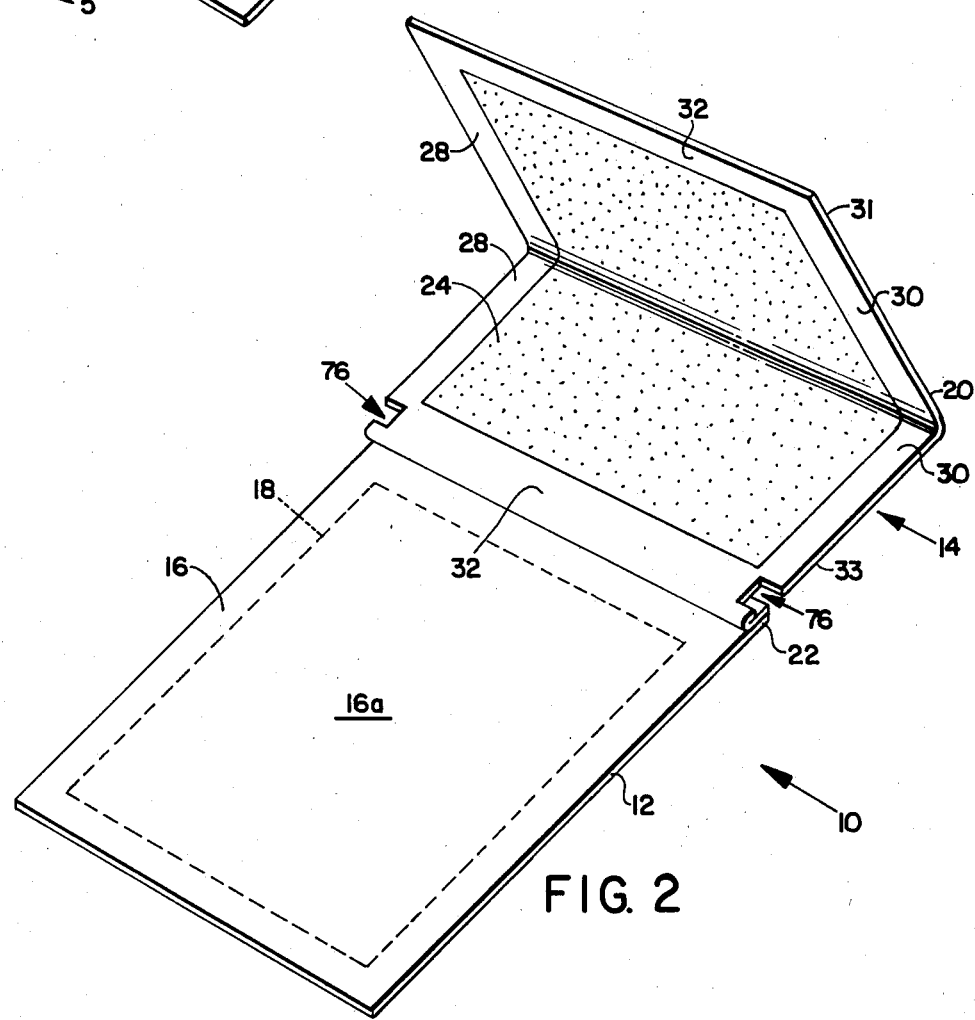
FIG. 2 shows the film unit of FIG. 1 with the applicator in an unsealed partially opened position.
Figure 3:
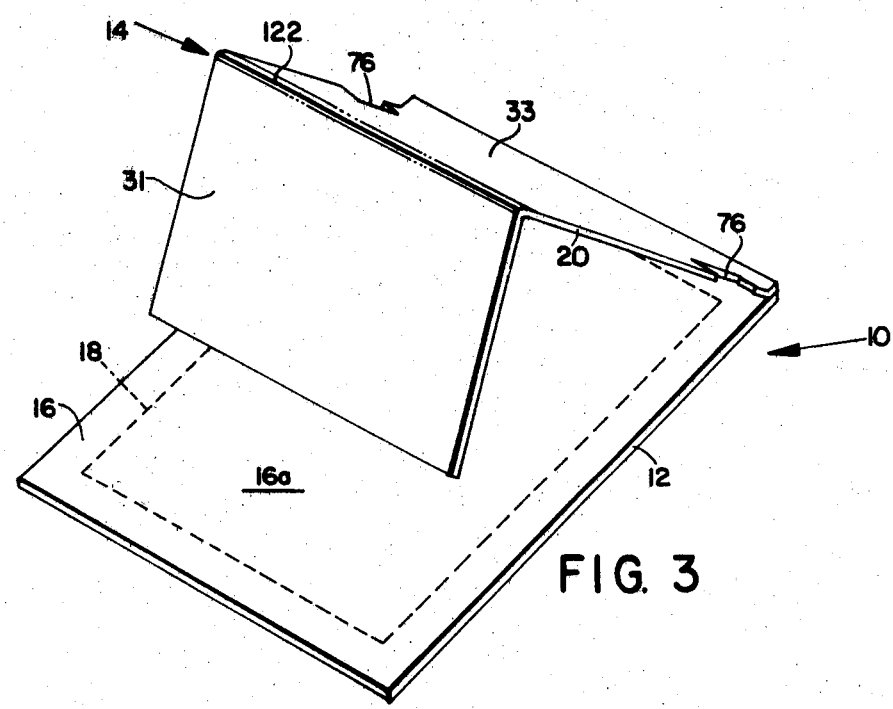
FIG. 3 shows the film unit of FIG. 1 with the applicator deployed in a tent-like configuration over a forward position of the film component.
Figure 4:
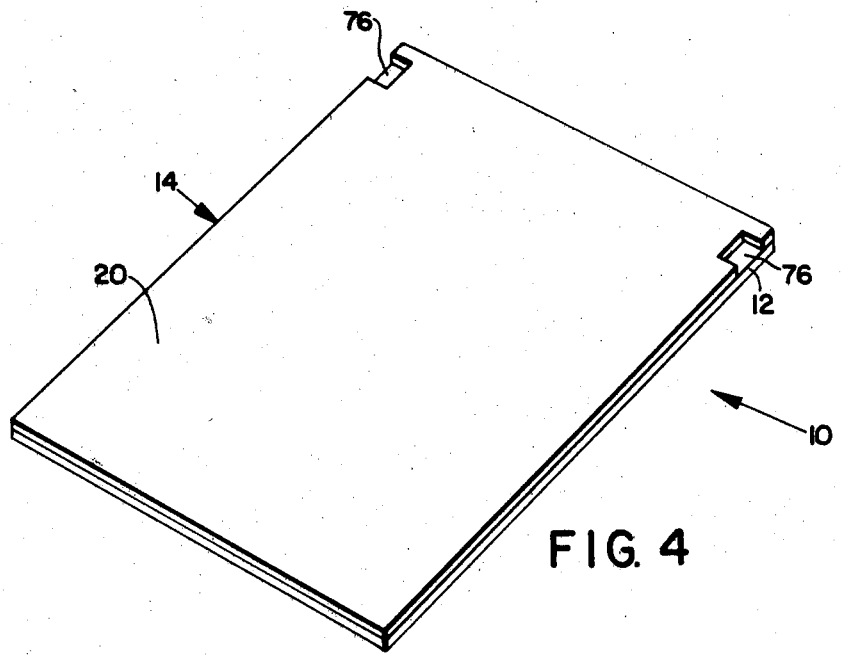
FIG. 4 shows the film unit of FIG. 1 with the applicator in its fully extended processing position overlying the film component.

After exposure of the photosensitive layer or layers of film component 12 which may be accomplished by directing image forming light or radiation onto top surface 16, or alternately, depending on the type of film construction, onto the bottom outer surface 34 opposite surface 16, the applicator 14 is moved from the folded sealed position to the unsealed extended processing position by urging or peeling wall sections 31 and 33 apart to unseal the marginal portions 28, 30 and 32 and extending sheet 20 rearwardly, as shown in the sequence of FIGS. 2, 3 and 4, so that it overlies outer surface 16 with the liquid holding means or pad 24 in liquid yielding contact with the given area 16a to effect wetting thereof. Depending on the type of film construction (a variety of which will be discussed later) the extended applicator 14 may be stripped away from surface 16 following a suitable imbibition period, or it may be left in place to form a permanently attached component, such as a protective cover sheet, of the processed film unit 10.

Film unit 10 offers many advantages over prior art self-developing film units that employ a jelly-like high viscosity liquid and other prior art self-processing film systems, described earlier, that utilize a low viscosity processing liquid.

Because the low viscosity processing liquid is substantially uniformly distributed by the soaked pad 24, the need to provide precision film and camera components and mechanisms to uniformly distribute the liquid with respect to the surface to be wetted is eliminated, thereby providing substantial cost savings. Also, by using a low viscosity liquid that has flow characteristics similar to water, transfer of the processing composition from the liquid holding means on the extended applicator 14 to the surface area 16a is readily accomplished by capillary action. The only requirement for such transfer to take place is to establish good contact between the facing surface of pad 24 and the surface area 16a which may be accomplished by advancing the film unit 10, with applicator 14 extended, between a pair of pressure applying rollers to press these two elements together as will be described later in detail. Advantageously, the rollers may be of relatively inexpensive construction because, in light of the predistribution of the liquid, they do not have to perform a liquid spreading function which would require expensive rollers manufactured to high tolerances to achieve the desired uniformity.

Another advantage of film unit 10 is that it does not require any trap structure at the trailing end to receive and store excess liquid as do film units that employ a high viscosity liquid which is discharged from a pod and progressively distributed between a pair of film layers from the leading to trailing end of the film unit.

Perhaps a more important advantage lies in the fact that film unit 10 combines in one simply constructed structure all of the necessary elements for processing the exposed film component 12 with a low viscosity liquid. That is, film unit 10 includes a self-contained supply of a low viscosity processing liquid which is protected from evaporation and environmental contamination by the liquid and air impervious enclosure formed by the folded and sealed sheet 20. Advantageously, the sheet 20 performs multiple functions. Because it is secured during manufacture to film component 12, in a predetermined position with respect to surface area 16a, sheet 20 serves as means for precisely aligning and registering the liquid holding means or pad 24 with respect to the surface area 16a thereby eliminating the need for processing mechanism structure to perform the registration function. When sheet 20 is extended, it serves to support and guide the attached soaked pad 24 to its operative processing position overlaying film component 12. Also, in addition to its earlier noted function of providing a liquid and air impervious enclosure for pad 24 when it is folded and releasably sealed, sheet 20 may serve as a protective cover sheet on one side of film component 12 if the extended applicator is to be left in place after completion of processing.

Another advantage of film unit 10 is that the applicator 14 is mounted on film component 12 outside of the boundaries of the predetermined image forming area 16a so as not to interfere with or block the film exposure process. By mounting applicator 14 on one end of film component 12, either of the outer surfaces 16 or 34 are available as exposure surfaces. The choice of whether to expose through the top or the bottom of the film component would of course depend on the design of the particular type of film utilized.

The types of film components 12 that may be combined with the applicator 14 to form a film unit 10 envisioned by this invention include, but are not restricted to, conventional black and white negative materials; and self-developing or instant diffusion transfer films including integral or peel apart type black and white and color reflection print and transparency films which include, in addition to the photosensitive layer or layers, an image receiving layer on which silver complexes or image dyes are deposited by diffusion, as a function of developing the exposed photosensitive layers.

The term "processing" in the context of this disclosure simply means wetting the surface area 16a with a low viscosity processing liquid to ultimately produce a desired photographic processing result. The particular processing that actually takes place is determined by the chemical properties of the liquid and the layer or layers of film component 12. The process resulting from wetting surface area 16a may be complex, for example, a development and diffusion transfer process associated with color self-developing films, or the process may be quite simple and limited to a single step such as developing. The processing liquid 26 may simply be water which is used to activate processing chemicals that are predisposed in selected layers of film component 12. Again, the present invention is intended to provide a film unit which includes a photosensitive film component and a self-contained supply of low viscosity processing liquid which is attached to the film component 12 in the form of an applicator 14 which is initially provided in a folded configuration to protectively enclose the liquid and is movable to an extended processing position to bring the liquid into wetting contact with a predetermined area of the film component 12 to initiate "processing," as broadly defined above, of the film component 12.

Figure 6:
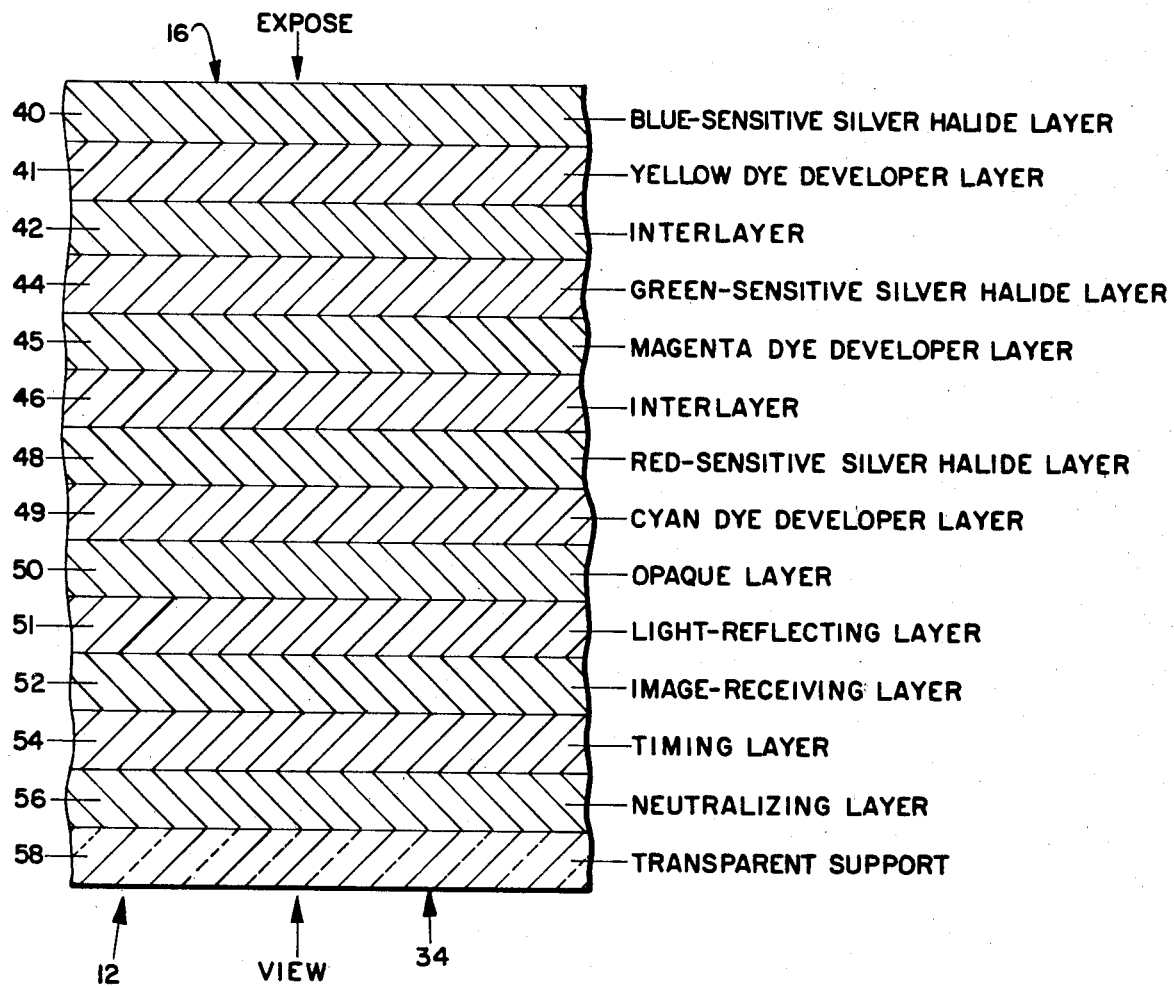
FIG. 6 is an enlarged diagrammatic cross-sectional representation showing the layers of color diffusion transfer type film component.

For a representative example of one type of photosensitive film component or laminate 12 that may be used in combination with the disclosed liquid applicator 14 to form a film unit 10 embodying the present invention, reference is made to FIG. 6 showing, in diagrammatic form, a color diffusion transfer process film unit component 12.

The illustrated photosensitive film component or laminate 12 is adapted to be exposed in a camera to image forming actinic radiation incident upon one side of component 12 as indicated by the arrow in FIG. 6 designated "expose." Subsequent to development and diffusion transfer of image dyes, a positive image is formed, in a dyeable image receiving layer viewable through the opposite side of component 12 as indicated by the arrow designated "view."

Starting on the exposure side, the layers comprising component 12 include, in sequence, a blue sensitive silver halide emulsion layer 40; a yellow dye developer layer 41; interlayer 42; a green sensitive silver halide emulsion layer 44; a magenta dye developer layer 43; interlayer 46; a red sensitive silver halide emulsion layer 48; a cyan dye developer layer 49; an opaque layer 50; a light-reflecting layer 51; a transparent, dyeable image-receiving layer 52; a transparent spacer or timing layer 54; a transparent neutralizing or acid layer 56; and a transparent support 58 on which the above-noted layers are coated in the reverse sequence of their identification herein, and through which the positive image is viewed.

Following exposure of the three photosensitive emulsion layers 40, 44 and 48 by directing image-forming actinic radiation onto the outer surface area 16a of layer 40, the liquid applicator 14 is moved from its folded position to its extended position to bring the pad 24 soaked with the low viscosity liquid processing composition 26 into engagement with surface area 16a to effect wetting thereof with liquid 26.

The low viscosity processing liquid 26 includes as a primary ingredient thereof an aqueous solution of an alkaline material, for example, potassium hydroxide, or the like, in a concentration to provide the appropriate pH for the process.

The permeation of liquid 26 initiates development of the exposed photosensitive emulsions. The associated dye developers are immobilized or precipitated in developed areas as a consequence of such development. In unexposed and partially exposed areas of the photosensitive emulsions, the unreacted dye developers provide imagewise distributions of diffusible dye developer. At least part of these imagewise distributions of diffusible dye developer is transferred, by diffusion, through the opaque layer 50 and the light-reflecting layer 51 to the image receiving layer 52, to provide a positive color image of the developed image. After a predetermined time, liquid 26 permeates through the spacer or timing layer 54, and it reacts with the neutralizing acid layer 56 which is effective to cause reduction in the pH of the liquid to a predetermined pH. This reduction in pH level serves to stabilize the image.

The light-reflecting layer 51 is preferably white, e.g., titanium dioxide, to provide a suitable background against which the transferred dyes in the transparent image receiving layer 52 are viewed. The light-reflecting layer 51 in combination with opaque layer 50, e.g., of carbon black, prevent exposure or fogging of the photosensitive emulsions by light incident upon the viewing side of film component 12. If the extended applicator 14 also includes at least one opaque layer, it serves to block unwanted exposure from the opposite side once it is in place thereby allowing completion of the film processing cycle to take place in an actinic environment, such as outside of the camera. That is, if the applicator 14 is opaque and is extended over outer surface 16 before the film unit exits the camera, the extended applicator 14 in combination with the light blocking properties of light-reflecting layer 50 and opaque layer 51 prevent further exposure of the emulsions 40, 44 and 48 thus allowing the film unit 10 to be removed from the camera before the processing cycle has been completed.

While the illustrated diffusion transfer film component 12 of film unit 10 shown in FIG. 6 is configured for exposure through one side and viewing through the opposite side, it should be understood that the present invention is not restricted to the use of such a film component 12. That is, other types of diffusion transfer film components 12 having different arrangements of layers may be combined with applicator 14 to provide a film unit 10 embodying the present invention. For example, the film component 12 may be configured so that it is both exposed and viewed through one side and processed by wetting that same one side or the opposite side. Alternatively, the film component may be configured to be peeled apart after processing at a designate layer interface to reveal the diffusion transfer image. Film components 12 may be provided wherein opaque layer 51 is omitted. In this case the processing must take place in a light excluding environment to prevent fogging. Also, the film component 12 may be configured so that the processing liquid is applied to an outer surface through which the diffusion image is viewed subsequent to processing, if the used sheet 20 is removed to uncover the image.

As noted earlier, it is within the scope of the present invention to utilize any suitable type of photosensitive film component 12 in combination with applicator 14 to form a self-processing film unit 10. Diffusion transfer film components 12 may be integral or peel-apart types; black and white or color; reflection print or transparencies. Also, the film component 12 may be a conventional negative sheet.

The construction of photosensitive materials like film component 12 is well known and described in the literature. Since the particular photographic process embodied in such film components forms no part of the present invention, such processes and film components need not be described in detail herein. Nevertheless, U.S. Pat. Nos. 3,594,164 and 3,888,669 and British Pat. No. 1,330,524 may be noted as illustrative descriptions of photosensitive materials of the general type illustrated in FIG. 6 and employing a variety of image dye-forming materials, dye developers being preferred in the noted U.S. patents.

As noted above, this invention may be utilized with a variety of photographic imaging systems to give black and white or color images. Thus, a black and white negative image may be obtained, without the formation of a positive transfer image, by using a photosensitive element and a processing composition such as that described in U.S. Pat. No. 3,721,562. Black and white silver transfer images may be obtained, for example, by the use of a layer arrangement such as shown in U.S. Pat. No. 3,705,804.

The image dye-providing materials which may be employed in such processes generally may be characterized as either (1) initially soluble or diffusible in the processing composition but which are selectively rendered non-diffusible in an imagewise pattern as a function of development; or (2) initially insoluble or non-diffusible in the processing composition but which are selectively rendered diffusible or provide a diffusible product in an imagewise pattern as a function of development. These materials may be complete dyes or dye intermediates, e.g., color couplers. The requisite differential in mobility or solubility may, for example, be obtained by a chemical action such as a redox reaction or a coupling reaction.

As examples of initially soluble or diffusible materials and their application in color diffusion transfer, mention may be made of those disclosed, for example, in U.S. Pat. Nos. 2,968,554; 2,983,606; 3,087,817; 3,345,163; and 3,443,943. As examples of initially non-diffusible materials and their use in color transfer systems, mention may be made of the materials and system disclosed in U.S. Pat. Nos. 3,185,567; 3,230,082; 3,443,939; 3,443,940; 3,227,550; 3,227,552; 3,719,489; and 4,076,529.

It is also to be undersood that the silver halide emulsions may be negative-working or postive-working (e.g., internal latent image emulsions), depending upon the particular image dye-providing substances employed and whether a positive or negative color transfer image is desired.

As noted earlier, sheet 20 of applicator 14 in its folded and releasably sealed configuration of FIGS. 1 and 5 forms a liquid and air impervious enclosure about pad 24 to prevent evaporation of the liquid 26 therein and to protect the liquid from contamination by elements in the environmental atmosphere from the time sheet 20 is sealed at manufacture until it is unsealed at the time of use.

Figure 7:
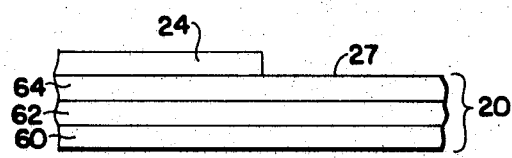
FIG. 7 is an enlarged diagrammatic cross-sectional representation of an impervious sheet employed in the applicator.

Typical material suitable for use as applicator sheet 20 preferably are alkali resistant composite materials such as the type shown in FIG. 7 comprising a multilayer laminate formed by an outer sheet or layer 60; a middle sheet or layer 62, and an inner sheet or layer 64 having the surface 27 on which the liquid holding means or pad 24 is carried.

The outer sheet or layer 60 is a thin, flexible, relatively inexpensive, tough material which may be a plastic but which is preferably an opaque paper such as kraft paper. The middle layer or sheet 62 is a thin, impervious sheet material such as metal foil, for example, a lead or very soft temper aluminum foil, approximately 0.001 inch in thickness and attached to outer sheet 60 by any simple means known to the art such as adhesive bonding or the like. The inner layer 64 is preferably a thermoplastic resin, inert to the liquid processing composition 26 and its vapors, such as polyvinyl chloride which may be adhered to the metal foil layer 62 by coating and/or laminating procedures well known in the art.

For a more detailed description of laminate materials suitable for use as sheet 20 along with examples of alternative materials that may be used in the individual layers thereof, reference may be had to commonly assigned U.S. Pat. Nos. 3,056,491; 3,056,492; 3,833,381; and 4,303,750 all of which are incorporated by reference herein.

The liquid holding pad 24 disposed on surface 27 of layer 64 of sheet 20 an absorbent and/or porous material which resists deterioration when in prolonged contact with the liquid 26. Such absorbent and/or porous materials include woven and non-woven sheet materials, natural and synthetic sponge materials, fibrous or cellulosic containing materials such as absorbent papers (e.g. blotters), natural or synthetic fiber textiles, porous plastic sheets and foils, plastic or other synthetic foams, and the like.

The liquid holding means on pad 24 may be formed as a separate sheet which is adhered, in its dry state before introduction of liquid 26 therein, to the thermoplastic layer 64 by adhesive or thermocompression bonding or the like. Alternatively, pad 24 may be provided initially in a form that allows it to be adherently coated, sprayed, or otherwise deposited on layer 64 so that the liquid holding means is formed in situ on sheet 20.

One representative example of a material that has been successfully employed as a liquid holding pad 24 is a non-woven sheet of polypropylene fiber, 0.004 inch thick, manufactured by the Kendall Corporation under the trade designation Webril non-woven sheet.

Figure 8:
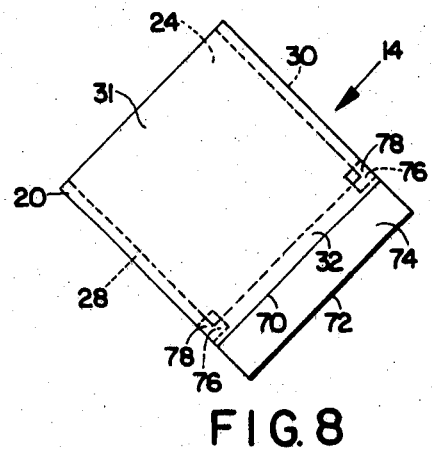
FIG. 8 is a perspective view of the applicator shown in its initial folded position.

The liquid applicator 14 is formed separately from the film component 12 during manufacture. As best shown in FIG. 8, the sheet 20 with pad 24 on interior layer 64 is folded back over on itself so that its upper trailing end edge 70 of wall section 31 is forward of its lower trailing end edge 72 of wall section 33 to provide an outwardly projecting and laterally extending tab 74 which is used as a point of attachment to permanently secure applicator 14 to the leading end 22 of film component 12 as will be described later.

Just forwardly of the upper trailing end edge 70, the underlying portion of wall 33 has two notches 76 cut therein at the lateral margins. These notches 76 provide access for a later to be described mechanism for engaging the overlying registered portions 78 on wall 31 and applying a force to the applicator to urge walls 31 and 33 apart and thereby peel open the marginal seals 28, 30 and 32.

The lateral marginal seals 28 and 30 and the longer transverse rear seal 32 may be formed by applying the heat and/or pressure to the corresponding superposed portions of the folded sheet 20 to effect adherence of the facing surfaces of the thermoplastic inner layer 64 outboard of the central area thereof on which pad 24 is disposed.

The liquid 26 may be applied to pad 24 before any of the seals are made with sheet 20 and pad 24 thereon either in a planar extended position or in the folded over configuration. Alternatively, sheet 20 may be folded and partially sealed before application of the liquid 26 to pad 24. In this instance, any one or two of the seals are made before the liquid is injected onto pad 24 through one or more of the remaining open sides which are then sealed following introduction of the liquid 26. The preferred sequence for wetting pad 24 and making the releasable seals 28, 30 and 32 will, of course, depend on the choice of design of high volume production machinery for manufacturing the applicator 14 in an efficient and cost-effective manner.

In the illustrated embodiment, cover sheet 20 is light opaque and the extended applicator 14 is intended to serve as a light blocking cover sheet for the exposure side of film component 12 so that the film unit 10 may be advanced directly into an actinic radiation environment following deployment of the applicator 14 to its extended processing position. Because the film component 12 provides a viewable image on the opposite side from the surface to be wetted, the extended applicator 14 may be adhered to film component 12 and left in place permanently following completion of processing. In this instance, the extended applicator 14 also serves a a long-term protective cover sheet or barrier layer that protects the exposure side of film component 12 from atmospheric contamination or degradation, for example, by inhibiting oxidation.

Even if applicator 14 is used with a film component 12 requiring the extended applicator 14 to be stripped away from outer surface 16 after the completion of processing, either simply to remove pad 24 from engagement with surface area 16a or to unblock a viewing surface in those film components that are structured so that the desired image is viewed through the surface to be wetted, it may be preferable to at least temporarily secure the periphery of the extended sheet 20 outboard of the pad 24 to the corresponding facing portions of the surface 16 to inhibit light and/or liquid leakage at this interface during processing.

In such an application the peripheral area of layer 64 of sheet 20, along the three sides thereof that are not attached to the leading end of component 12 at 22, may be coated with a reusable adhesive material that releasably bonds to itself when sheet 20 is folded to form the strippably releasable marginal seals 28, 30, and 32 and retains its adhesive properties so that it can be used again as adhesive to adhere these peripheral portions of layer 64 to the facing portions of surface 16 when applicator 14 is extended and pressed into contact therewith.

Alternatively, the peripheral portions of layer 64, along the three free sides thereof, may be initially coated with a dry contact type of adhesive which does not adhere to itself but will adhere to a complementary dry contact adhesive that is precoated on the facing peripheral portions of surface 16. In this instance, after sheet 20 is folded, the marginal seals 28, 30 and 32 may be formed, by the application of heat and/or pressure, as thin linear seal lines disposed on the outboard edges of pad 24 but inboard of the dry adhesive coating so that the seals are made between facing linear portions of the thermoplastic resin layer 64. Thus, in such an embodiment, the initial seals are made by thermocompression bonding and, after sheet 20 is extended and pressed into place, the peripheral or secondary seals are made by adhesive bonding.

In another alternative embodiment, the outer periphery along the three free sides of layer 64 may be provided without any additional adhesive coating thereon and may be heat and/or pressure sealed as noted above; and the corresponding facing peripheral area of the film component outer surface 16 may be precoated with a dry adhesive that is activated when contacted by the processing fluid 26 from pad 24. In this case, pad 24 would be made a little wider and longer to come in contact with at least the edge portions of the dry adhesive thereby activating the adhesive to form the bond when the applicator 14 is extended and brought into contact with surface 16.

As best shown in FIG. 5, the liquid applicator 14 is attached to the leading end 22 of film component 12 by folding the projecting trailing end tab 74 back under the bottom of the folded applicator 14 and securing its thermoplastic resin layer 64 to the facing, transversely extending, leading end portion of the film component outer surface 16 by any suitable means such as an adhesive bond suggested at 80. In FIg. 5 the marginal seals also are made by adhesive bonding employing a reusable adhesive suggested at 82 and 84.

As noted earlier, attaching applicator 14 to film component 12 at manufacture provides in a single film unit 10 all of the materials necessary for processing the film unit following its exposure. Also, by mounting applicator 14 on component 12 during the manufacturing process it is accurately aligned in position thereon so that the liquid holding means or presoaked pad 24 will be correctly registered with respect to the given surface area 16a on outer surface 16a when applicator 14 is moved to its extended position.

The applicator 14 may be secured to film component 12 in ways other than as shown in FIG. 5. For example, the tab 74 may be left in its outwardly projecting state, shown in FIG. 7, and be bonded to the underside of film component 12 on the outer surface of the bottom transparent layer 58.

The bond between the applicator 14 and component 12 must be strong enough to resist detachment of applicator 14 during its movement from its preregistered position due to the strain imposed on the bond when the applicator is unsealed and moved to its extended position. If the extended applicator 14 is to permanently remain on surface 16 after processing is complete, the bond at 22 may be permanent. However, if applicator 14 is to be removed after the completion of processing, the bond is preferably of the releasable type that can be stripped apart manually upon application of a peel-apart force that is greater than the forces applied to sheet 20 during extension of applicator 14. Alternatively, if the bond at 22 is not releasable, sheet 20 may be perforated adjacent the bond and simply be torn off after processing leaving a small bonded portion thereof on the leading end 22 of film component 12.

Figure 9:
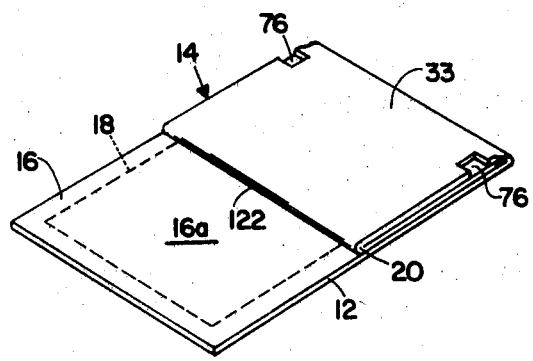
FIG. 9 is a perspective view of an alternative embodiment of the film unit incorporating the present invention.

The applicator 14 may be initially provided on the film component 12 in the configuration shown in FIGS. 1 or 5, wherein it extends forwardly out beyond the leading end 22, or it may be folded back over component 12 to provide a more compact configuration for packing and storage, wherein it overlies the forward half of outer surface 16 in substantially parallel relation thereto as shown in FIG. 9.

If surface 16 is the exposure surface, the applicator 14 will have to be pivoted upwardly away from surface 16 at least to a position sufficiently upright with respect thereto so the applicator 14 does not intrude into the cone of image forming light directed at the image area 16a.

FIGS. 10 through 16 show one type of processing apparatus 90, embodying the present invention, especially configured to manipulate an effect processing of a film unit 10 configured as shown in FIG. 9. Broadly speaking, the illustrated apparatus 90 includes; means for supporting the film unit 10; means for moving the applicator 14 from its overlying position of FIG. 9 to an upright position, shown in FIG. 12, in preparation for exposure and the subsequent unsealing of the marginal seals 28, 30 and 32; and means for moving the unsealed applicator to its extended position for locating the liquid soaked pad 24 in liquid yielding contact with the surface area 16a of film component 12.

Figure 10:
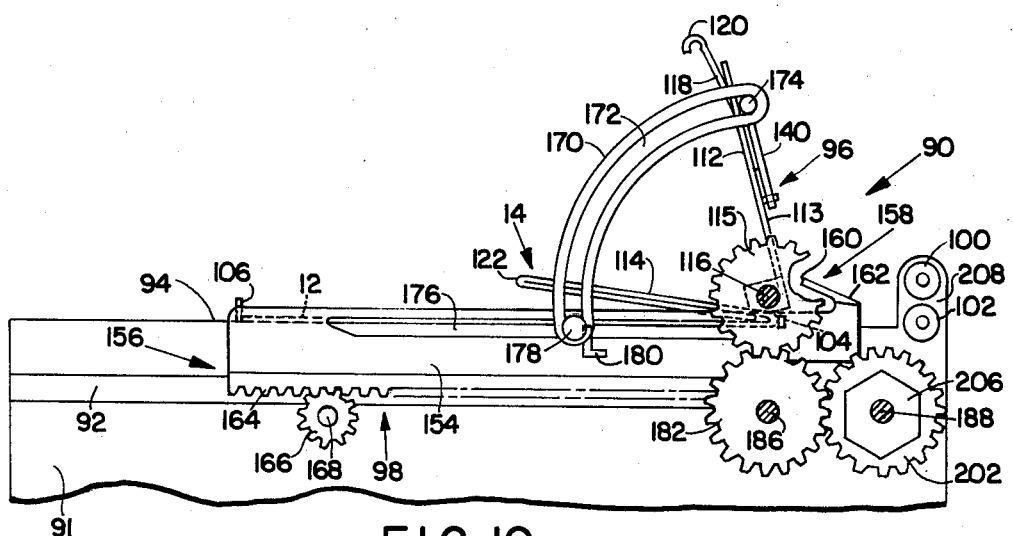
FIGS. 10–14 are sequential side elevational views, partially cut away in some instances, of the processing apparatus embodying the present invention showing the operational steps of the apparatus.
Figure 11:
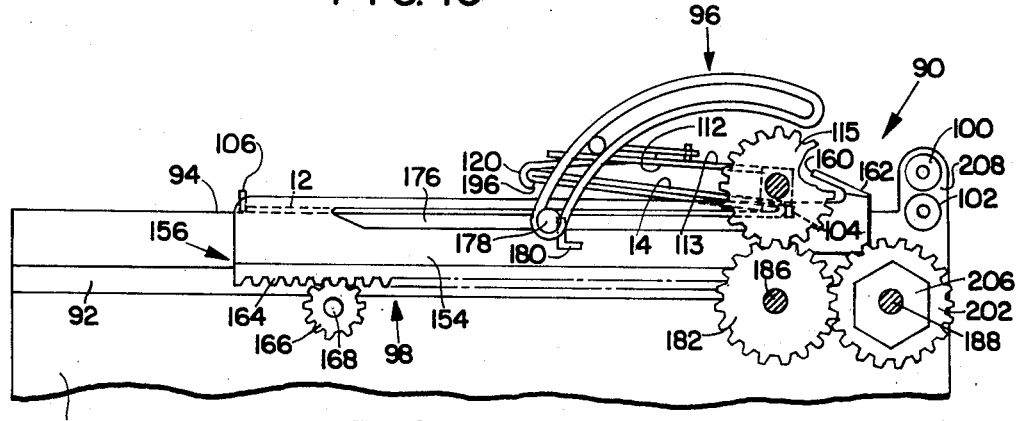
Figure 12:
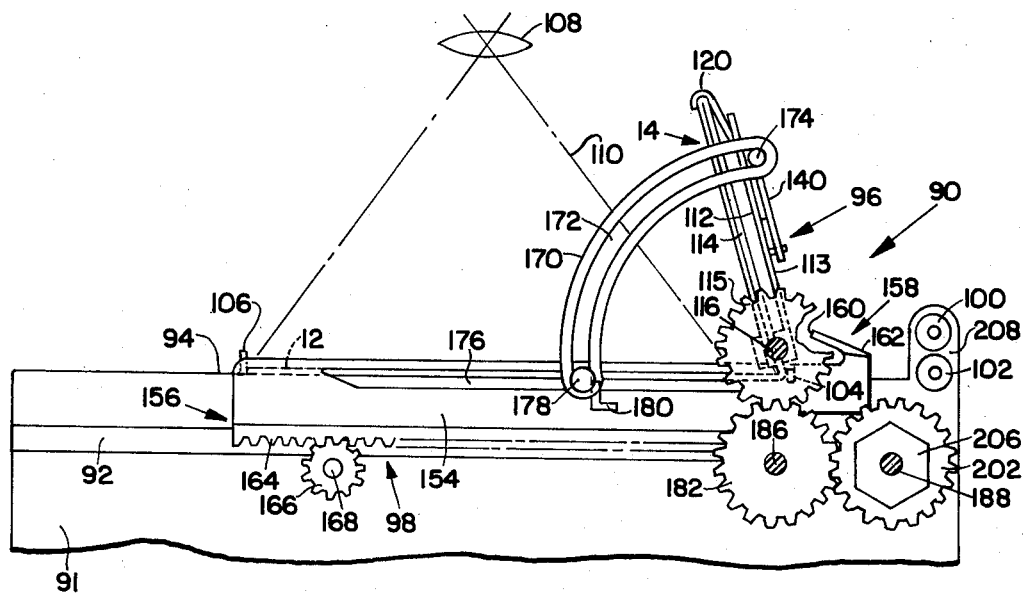
Figure 13:
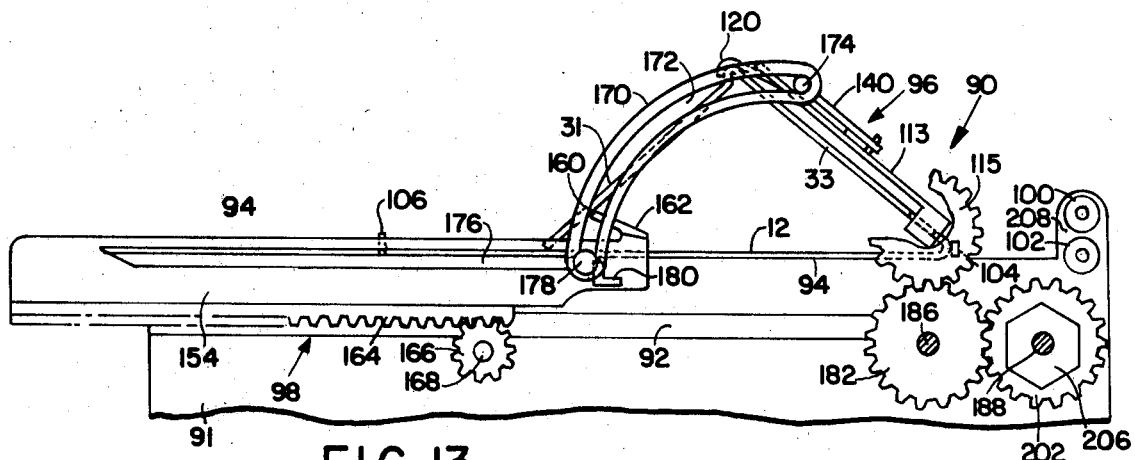
Figure 14:
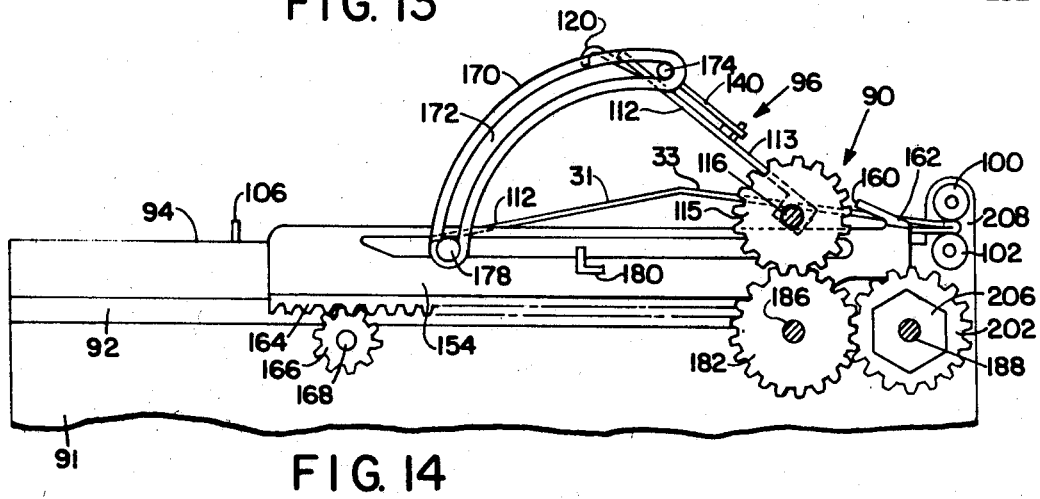

Major components of processing apparatus 90 include a base 91 having a platen-like member 92 which includes: an upper horizontal film surface 94; a pivoting applicator erecting arm assembly 96 for engaging the applicator 14 and pivoting it upwardly from its flat initial position to its substantially upright erected position (as shown in the sequence of FIGS. 10 through 12) in preparation for film exposure in subsequent operations for unsealing the marginal seals 28, 30 and 32; a pick assembly 98 mounted for reciprocating motion for first unsealing the marginal seals and then advancing the film unit 10; and a pair of juxtaposed pressure applying rollers 100 and 102 between which the film unit is advanced to press the liquid soaked pad 24 into good contact with surface area 16a as shown in the sequence of FIGS. 13 and 14.

Means for supporting the film unit 10 include support surface 94 and laterally extending upstanding leading and trailing end stops or ribs while 104 and 106 thereon would selectively limit longitudinal movement of the film unit 10, as will become apparent later. The support means also includes a pair of upstanding side rails for limiting lateral movement of the film unit. In an alternative preferred embodiment, apparatus 90 may be built into a self-developing camera, and a plurality of stack units 10 may be provided in a cassette which is supported in a receiving chamber in platen 92. In this case, the forward-most film unit 10 would be supported within the cassette at the same position to find for the illustrated single film unit 10 by surface 94, and the stops or ribs 104 and 106 would be integrally formed on the opposing leading and trailing end walls of the cassette.

FIG. 12 diagrammatically shows the objective lens 108 of such a camera and the outer boundary lines 110 of a cone of image forming light projected by lens 108 onto the outer surface 16 of the film component 12 supported at a defined exposure position on support surface 94.

The initial function of apparatus 90 is to pivot the applicator 14 upwardly from its folded down position of FIG. 10 to its substantially upright exposure position of FIG. 12 outside of the cone of image forming light bounded by lines 110 so as not to block or intrude into the light path between lens 108 and the film component 12 supported on surface 94.

Figure 16:
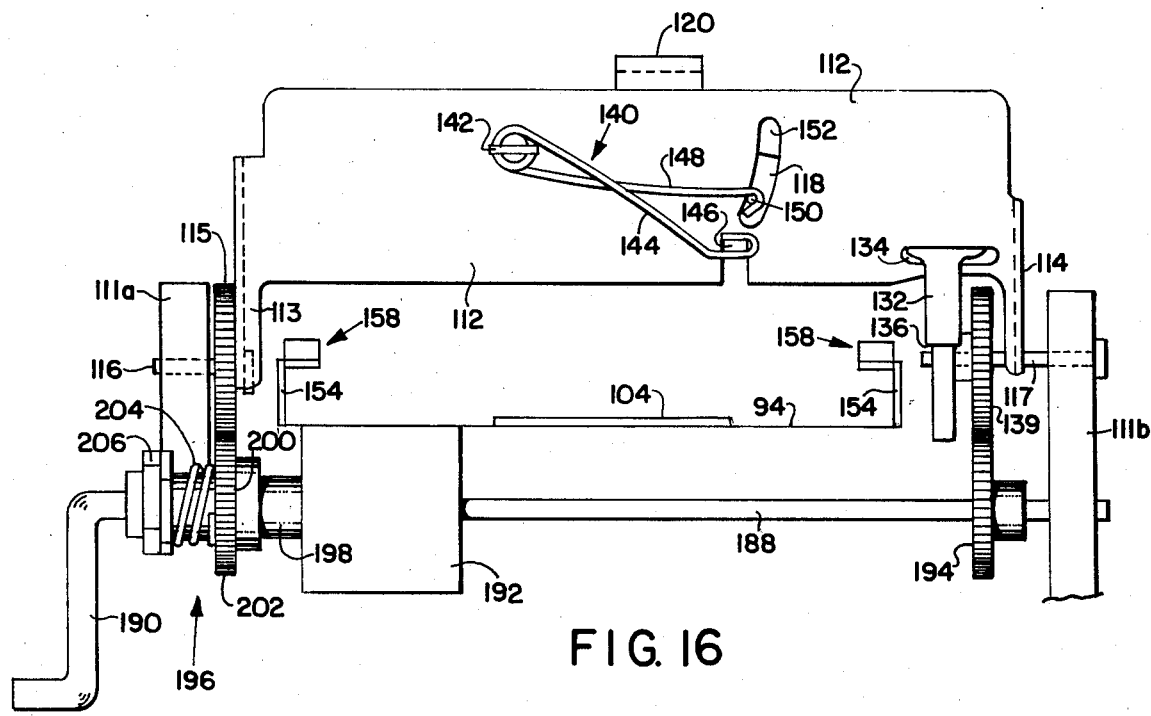
FIG. 16 is a rearward looking elevational view of the erecting arm assembly.

FIG. 14 shows the applicator erecting arm 96 from its rear side facing the film support surface 94 and FIG. 16 shows it fom the opposite forward facing side. Assembly 96 is mounted between a pair of laterally spaced upright supports 111a and 111b on base 91. It includes a pivoting thin, flat, sheet metal erecting arm 112 that extends laterally between supports 111a and 111b and includes a pair of depending legs 113 and 114 at opposite ends thereof. Leg 113 is fixed to the inside face of a gear 115, by a screw 115a, that is fixed to a rotatably mounted short shaft 116 on support 111a. Leg 114 pivots on an inwardly extending fixed short shaft 117 mounted on support 111b.

Figure 15:
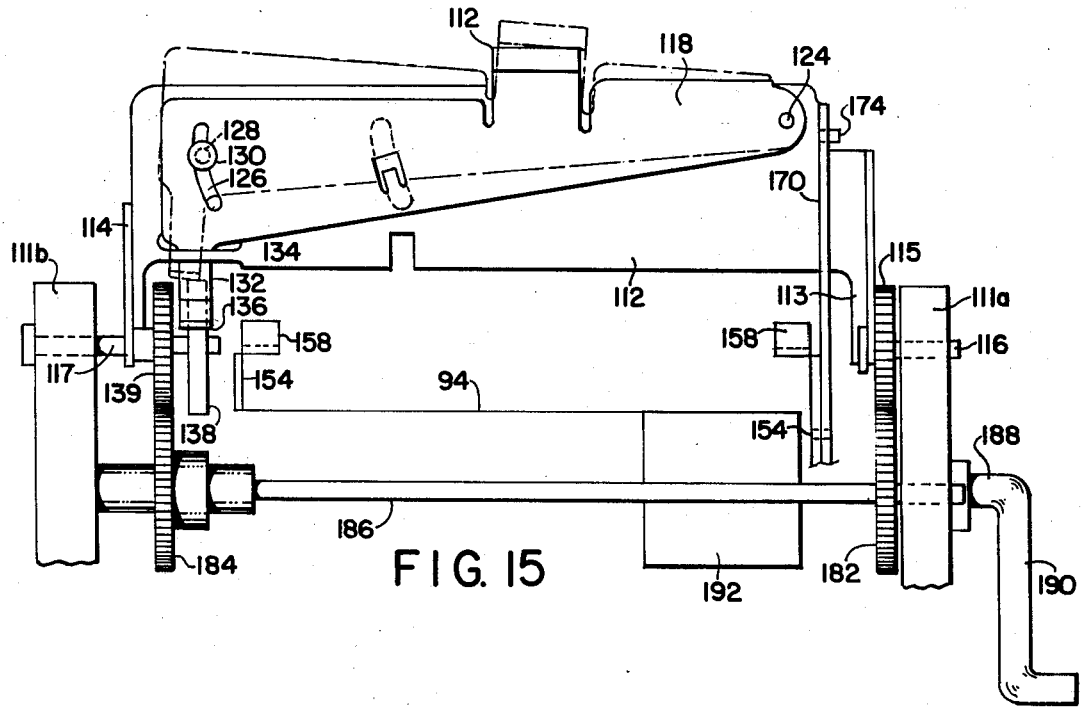
FIG. 15 is a forward looking elevational view of an applicator erecting arm assembly forming part of the processing apparatus.

As best shown in FIGS. 15 and 16, the plate-like major portion of arm 112 has a thin sheet metal plate 118 pivotly mounted on the side thereof for movement between the retracted position shown in solid lines in FIG. 15 and the extended position shown in dotted lines. Plate 118 includes an integrally formed outwardly extending hook member 120 that is adapted to engage the fold line or leading end 122 of the applicator 14. Plate 118 is pivotly coupled at its right end (as viewed in FIG. 15) to arm 112 at pin 124. A curved guide slot 126 is provided at the opposite end of plate 118 for receiving an outwardly projecting pin 128 on arm 112 that has a peened over head 130 for retaining the left end of plate 118 in close sliding contact with the facing surface of arm 112. Below slot 126 is a depending foot 132 that passes through an offset opening 134 in arm 112 and has a lower cam follower end 136 in engagement with the peripheral cam surface of an eccentric cam 138 that is rotatably mounted on shaft 117 and fixedly secured to the inside face of a gear 139 adjacent thereto that is also free to rotate about shaft 117. The drive structure for rotating gear 115 to pivot arm 112 between its operative positions and to rotate gear 139 for effecting rotation of cam 138 will be discussed later.

Plate 118 is biased downwardly towards its retracted position by a torsion spring 140 mounted on the backside of arm 112. Spring 140 has its center coiled about a tab 142 on arm 112, the end of one arm 144 fixed to another tab 146 on arm 112 and the end of the other arm 148 secured to pin 150 on plate 118 that projects outwardly through a curved slot 152 in arm 112. In this manner, spring 140 provides a biasing force on plate 118 to maintain the cam follower 136 in engagement with cam 138.

The pick assembly 98 comprises a pair of elongated slide members 154 that ride in a pair of corresponding longitudinally extending channels 156 provided in platen 92, on opposite sides thereof, outboard of the lateral margins of a film unit 10 supported on surface 94. Integrally formed at the leading end of each slide member 154 is an upstanding and inwardly extending pick 158 which includes a rearwardly extending finger 160 for effecting unsealing of the marginal seals by extending through a corresponding notch 76 in applicator sheet 20 in response to rearward movement of the slide member 154 and pushing against the aligned portion 78 to separate the folded wall sections 31 and 33 of sheet 20, and a forwardly projecting finger 162 which, in response to forward movement of slide member 154, slides between the partially deployed applicator and component 12 and pushes on the applicator to film component connection to advance the film unit 10 into the bite of the pressure applying rollers 102 and 104.

Each of the slide members 154 has an elongated gear tooth rack 164 depending from the underside thereof which is in engagement with a corresponding one of a pair of pinion gears 166 that are fixed on opposite ends of a transversely extending shaft 168 rotatably mounted on base 91. In this manner, the slide members 154 are mounted on base 91 for linear reciprocating motion with respect to the film unit located at its operative position on support 94.

The pivotal motion of erecting arm 112 is limited to a predetermined arc segment by a curved guide member 170 that has a circular segment slot 172 which receives an upper guide pin 174 on arm 112. The lower end of guide member 170 is slideably pinned through an elongated slot 176 in slide member 154 by means of a peened over rivet 178. A fix stop 180 is provided on base 191 outboard of the slide member 154 and limits forward motion of the lower end of guide member 170 in slot 176 by the abutment of rivet 178 against stop 180.

In the illustrated embodiment, the means for driving the applicator erecting arm 112 and cam 138 includes a gear train and slip clutch arrangement. This mechanism includes a pair of laterally spaced idler gears 182 and 184 freely rotatable on a common shaft 186 having its opposite ends supported in bearings on the corresponding supports 111a and 111b, as best shown in FIG. 15. Gear 182 is directly below and in mesh with the erecting arm gear 115. Gear 184 is directly below and in mesh with the cam drive gear 139.

As best shown in FIG. 16, a rotatable shaft 188 having an integrally formed crank handle 190 on its left-hand end extends through a bearing block 192 on base 91 and into an aligned bearing on support 111b. A gear 194 is fixedly secured to shaft 188 and is in mesh with the corresponding idler gear 184 so that cam 138 is turned in response to rotation of shaft 188 through a cam drive train comprising gears 194, 184 and 139.

A gear and slip clutch arrangement 196 is provided on shaft 188 between crank handle 190 and bearing block 192. This arrangement comprises a hollow cylindrical body or tube 198 carried on shaft 188 and secured thereto, a clutch plate 200 integrally formed on body 198, a gear 202 rotatably carried on body 198 and in mesh with idler gear 182, a helical clutch spring 204 for urging gear 202 against clutch plate 200, and an adjustment nut 206 threaded on the outboard end of body 198 for adjusting the compression force of spring 204 acting to urge gear 202 against plate 200. The spring force is adjusted so that clutch plate 200 and the end of spring 204 frictionally drive gear 202 as body 198 rotates with shaft 188 without slippage provided that the load on gear 202 is below a predetermined maximum value. When this load value is exceeded, the clutch plate 200 and the end of spring 204 slip with respect to the side faces of gear 202 so that it no longer rotates when shaft 188 turns. This configuration allows limited independent operation of the applicator erecting arm 112 and the hook carrying plate 118 thereon with respect to the cam drive as will become apparent later. The pick mechanism 98 is driven back and forth along its linear reciprocal path by selectively rotating shaft 168 to drive the pinion gears 166 thereon. The rollers 102 and 104 are rotatably mounted on base 91, for example on a pair of stanchions 208 (only one of which is shown). At least one of the pair of rollers is power driven to advance the film unit 10 therebetween.

The pick mechanism 90 may be manually driven by providing a crank handle on shaft 168. A similar manual drive system may be provided for the pressure applying rollers. However, it is preferred to selectively drive the applicator erecting arm, pick mechanism and rollers with a motorized drive system comprising one or more small reversible electric motors, appropriate drive train components and a sequence control subsystem which may be provided by applying motorized drive system principles known in the art.

In operation, apparatus 90 functions as follows. The components of apparatus 90 are initially set as shown in FIG. 10 with the erecting arm 112 raised in its upright position, and cam 138 oriented so that the hook plate 118 is retracted. The pick slide members 154 are in a forward position to locate the picks 158 forwardly of the raised arm 112. The film unit 10 is located at its operative exposure position on plate 94 with the applicator 14 folded down over the forward half of outer surface 16 (exposure surface) of film component 12. When apparatus 90 is built into a camera, the raised erecting arm 112 may be accommodated within the confines of a bellow structure extending between the objective lens and the film support surface.

In response to rotating shaft 188 in a counterclockwise manner gears 194 and 202 thereon simultaneously drive gears 182 and 184 on shaft 186 in the clockwise direction. This motion of gear 182 drives gear 115 in a counterclockwise direction about shaft 116 thereby pivoting the erecting arm 112 downwardly to a position overlying the folded applicator 14, as best shown in FIG. 11. Gear 184 on the opposite end of shaft 186 drives the cam gear 139 in a counterclockwise direction at the same time. However, because the arm 112 is also pivoting downwardly at the same rate, through its connection with gear 115, there is no relative motion between the cam follower end 136 and the cam 138. Therefore, the hook plate member 118 remains in its retracted position until arm 112 engages the folded applicator 14. The abutment of erecting arm 112 against applicataor 14 prevents further downward rotation of erecting arm 112 and loads the gear train so that clutch 196 slips thereby effectively disengaging gear 202 from further driving the erecting arm. With gear 202 disengaged, shaft 188 is further rotated in a counter-clockwise direction to rotate cam 138 through gears 194, 184 and 139. As cam follower end 136 follows the peripheral surface of rotating cam 138 it is pushed outwardly to pivot plate 118 and thereby move hook member 120 outwardly to its extended position shown in dotted lines in FIG. 15 wherein it clears the forward end 122 of applicator 14. Further rotation of cam 138 causes the follower end 136 to retract under the influence of spring 140 thereby moving plate 118 back to its retracted position moving hook member 120 into capturing engagement with applicator end 122.

With the applicator 14 now engaged by hook member 120, the drive to shaft 188 is reversed thereby raising the erecting arm 112 and the engaged applicator to the substantially upright or erected position shown in FIG. 12. The erected position is established by the pin 172 on arm 112 abutting against the end of the curved guide member slot 172. When arm 112 is so arrested, the clutch mechanism will disengage the driving action of gear 202. Again, when arm 112 is pivoted upwardly, the cam gear 139 pivots but there is no relative motion between cam 138 and cam follower 136 so that hook member 120 remains in its retracted position gripping the top end 122 of the applicator 14.

With the applicator erecting arm assembly in its upright raised position of FIG. 12, the applicator 14 is located outside of the cone of light transmitted by lens 108 thereby permitting exposure of film component 12 supported on surface 94.

Following exposure, the applicator erecting mechanism maintains the applicator 14 in its upright position and the pick mechanism 98 is actuated effecting unsealing of the marginal seals 28, 30 and 32. Pick drive shaft 68 is rotated in a counterclockwise direction to drive the pick slide members 154 rearwardly. In response to this motion, the rearwardly facing pick fingers 160 travel through the corresponding notches 76 in the rear wall section 33 of the raised applicator and engage and exert a rearwardly push on the overlying portions 78 on the opposite wall section 31 of cover sheet 20. The film component 12 is prevented from sliding rearwardly in responsive to the force exerted by fingers 160 by its abutment with the trailing end rib 106. The applicator 14 is retained in its upright position by the engagement of hook member 120. Thus, the rearwardly pushing or urging force applied by the pick fingers 28 pushes the rearwardly facing wall section 31 of cover sheet 20 away from the opposite wall section 36 closest to erecting arm 112 creating a shear force within the bond between the two wall sections which is effective to strip or peel the marginal seals 28, 30 and 32.

In addition to unsealing the marginal seals, the rearwardly advancing pick fingers 160 begin to deploy the unsealed cover sheet and move it toward its extended position. As best shown in FIG. 13 when the pick slide members 154 are in their rearwardmost position the wall sections 31 and 33 of sheet 20 form a tent-like structure over surface 16. During such rearward movement, the fold line end 122 remains in engagement with hook member 120. During the course of rearward movement of the slide members 154, the lower end of the curved guide 170 is pick up and moved rearwardly by slide member 154 so as to pivot the erecting arm 112 downwardly toward support surface 94 thereby also pushing down on the wall section 30 of cover sheet 20. In this manner the urging of erecting arm 112 also helps to move cover sheet 20 toward its extended position.

With the cover sheet 20 in its partially deployed position of FIG. 13, the drive to the pick mechanism is reversed to drive the slide members 154 forwardly, as best shown in FIG. 14, and fingers 162 slide into the junction between the leading end of the applicator sheet 20 and the leading end of film component 12, and push on the joint therebetween to advance the film unit 10 up over the short rib 104 and into the bit of the pressure applying rollers 100 and 102. The rollers are driven in a manner to effect advancement of the two film unit elements there between, thereby pressing the presoaked pad 24 on the interior surface of the extended sheet 20 into good contact with the surface area 16a of film component 12 to effecting wetting of the image area.

Those skilled in the art will appreciated that the rollers 100 and 102 do not have to be manufactured to highly precise tolerances in that their function is merely to press the two film unit elements together to establish good contact therebetween rather than also have to spread the processing fluid in a precise thickness.

Because the impervious sheet 20 is opaque and forms a back cover sheet for the exposed film unit, film unit 10 may be advanced from the pressure rollers directly into an actinic radiation atmosphere without causing further exposure of film unit 10. Passage through the pressure applying rollers also presses the peripheral areas of the cover sheet 20 into good contact with the facing peripheral areas of the film component surface 16 to establish a marginal seal therebetween as described earlier. Depending on the type of film construction, the sheet 20 may be stripped from film component 12 following processing or, it may be left in place permanently to serve as a cover sheet if the image is viewed through the opposite side of the film unit.

The liquid holding means in application may take forms other than a liquid soaked absorbent pad 24. For example, pad 24 may be replaced with a layer of microcapsules, each enclosing a drop of liquid processing composition, adhered to surface 27. In response to advancing the film unit through the pressure applying rollers, the microcapsules rupture thereby releasing the liquid to effect wetting of surface area 16a.

Since certain changes may be made in the above-described film unit and processing apparatus without departing from the spirit and scope of the invention involved herein, it is intended that all matter contained in the above description or shown in the accompanying drawings shall be interpreted as illustrative and not in a limiting sense.

What is claimed is:

1. Processing apparatus for use with a self-processing film unit of the type including a sheet-like film component including one or more photosensitive layers and having an outer surface with a given area thereof that is configured to be wetted with a low-viscosity processing liquid to initiate processing of the one or more layers, and a liquid applicator secured to one end of the film component and including an impervious sheet carrying on an inner surface thereof means yieldably holding a substantially uniformly distributed supply of such liquid, the applicator being initially provided in a folded and releasably sealed configuration forming an impervious enclosure about the liquid holding means, and being configured for movement to an unsealed extended configuration overlying the outer surface with the liquid holding means in liquid yielding contact with the given area to effect wetting thereof, said apparatus comprising;

means for supporting such a film unit; and means, engageable with the folded applicator, for unsealing the impervious sheet and for moving the unsealed applicator to its extended configuration to locate the liquid holding means in liquid yielding contact with the given area to effect wetting thereof.

2. The apparatus of claim 1 wherein said unsealing and moving means includes means for urging said liquid holding means into contact with the given area of the outer surface of the film component.

3. The apparatus of claim 2 wherein said urging means includes means for applying a compressive pressure to the extended applicator and the film component.

4. The apparatus of claim 3 wherein said compressive pressure applying means includes a pair of pressure applying rollers.

5. The apparatus of claim 1 wherein the impervious sheet is folded back on itself and is releasably sealed along facing marginal portions thereof to form an enclosure having two opposed wall sections and said unsealing and moving means includes means for urging the two wall sections apart to effect release of the seal.

6. The apparatus of claim 5 wherein one of the wall sections includes at least one notch therein along a marginal portion providing access to an overlying portion of the other wall section, and said unsealing and moving means includes a pick member movably through the one notch for engaging the overlying portion of the other wall section and applying a force thereto to urge the other wall section away from the one wall section to effect release of the seal.

7. The apparatus of claim 6 wherein said unsealing and moving means includes means for applying a compressive pressure to the extended applicator and the film component and said pick serves both to effect unsealing of the applicator and to advance the film unit into operative relation with said pressure applying means following unsealing operations.

8. The apparatus of claim 7 wherein the pick is mounted for movement in one direction to effect unsealing operations and is mounted for movement in the opposite direction to effect film advancement to said pressure applying means.

9. The apparatus of claim 1 wherein the folded applicator is initially provided in substantially overlying relation to a portion of the outer surface and said apparatus further includes means for pivoting said applicator to a position that is sufficiently upright with respect to the outer surface to allow exposure of the film component by light directed at the outer surface.

10. Processing apparatus for use with a self-processing film unit of the type including a sheet-like film component including one or more photosensitive layers and having an outer surface with a given area thereof that is configured to be wetted with a low-viscosity processing liquid to initiate processing of the film component, and a liquid applicator secured to one end portion of the film component and including an impervious sheet carrying on an inner surface thereof means yieldably holding a substantially uniformly distributed supply of such a low-viscosity liquid, said applicator being initially provided in a folded and releasably sealed configuration forming an impervious enclosure about the liquid holding means, and being configured for movement to an unsealed extended configuration overlying the outer surface with the liquid holding means in liquid yielding contact with the given area to effect wetting thereof, the applicator being disposed in an initial position so that it is in overlying relation to a portion of the outer surface of the film component, said apparatus comprising:

means for supporting such a film unit;

means for pivoting the folded applicator from its initial position to another position wherein it is sufficiently upright with respect to the outer surface to allow exposure of the film component by light directed at the outer surface;

means for engaging and applying a compressive pressure to the extended applicator and the film component to urge the liquid holding means into contact with the given area; and a pick mechanism movable in a first direction for engaging the applicator in its sufficiently upright position to effect unsealing thereof and moving it at least partially toward its extended configuration and, thereafter, movable in a second direction to advance the film unit into engagement with said pressure applying means.

11. The apparatus of claim 10 wherein said means for pivoting the folded applicator includes an erecting arm assembly having a movable hook member thereon for capturing and holding an edge of the applicator.

12. The apparatus of claim 10 wherein said pick mechanism includes a pick mounted for linear reciprocating movement, said pick being engageable with said applicator when moved in said first direction for applying a force thereto that is effective to break the applicator seal.

13. The apparatus of claim 10 wherein said pressure applying means includes a pair of pressure applying rollers.

* * * * *